United States Patent [19]
Good et al.

[11] Patent Number: 5,420,984
[45] Date of Patent: May 30, 1995

[54] APPARATUS AND METHOD FOR RAPID SWITCHING BETWEEN CONTROL OF FIRST AND SECOND DMA CIRCUITRY TO EFFECT RAPID SWITCHING BEWEEN DMA COMMUNICATIONS

[75] Inventors: Christopher J. Good, St. Briavels, United Kingdom; Joseph M. Nordman, West Bend, Wis.

[73] Assignee: Genroco, Inc., Slinger, Wis.

[21] Appl. No.: 106,186

[22] Filed: Aug. 13, 1993

Related U.S. Application Data

[63] Continuation of Ser. No. 906,911, Jun. 30, 1992, abandoned.

[51] Int. Cl.[6] .................................................. G06F 3/00
[52] U.S. Cl. ..................................... 395/275; 395/250; 395/425; 364/242.31; 364/DIG. 1
[58] Field of Search ........................ 395/250, 278, 425; 364/200

[56] References Cited

U.S. PATENT DOCUMENTS

| | | | |
|---|---|---|---|
| 4,032,899 | 6/1977 | Jenny et al. | 364/200 |
| 4,246,637 | 1/1981 | Brown et al. | 364/200 |
| 4,298,954 | 11/1981 | Bigelow | 364/900 |
| 4,475,155 | 10/1984 | Oishi et al. | 364/200 |
| 4,571,674 | 2/1986 | Hartung | 364/200 |
| 4,819,203 | 4/1989 | Shiroyanagi et al. | 364/900 |
| 4,965,801 | 10/1990 | DuLac | 371/40.1 |
| 5,150,465 | 9/1992 | Bush et al. | 395/275 |
| 5,193,149 | 3/1993 | Awiszio et al. | 395/200 |
| 5,195,089 | 3/1993 | Sindhu et al. | 370/85.1 |
| 5,276,842 | 1/1994 | Sugita | 395/425 |
| 5,297,260 | 3/1994 | Kametani | 395/325 |

*Primary Examiner*—Christopher B. Shin
*Attorney, Agent, or Firm*—Quarles & Brady

[57] ABSTRACT

A method and apparatus for improving sustainable data throughput between a host system minicomputer and a plurality of peripheral memories utilizes a dual-ported RAM memory, a microelectronic processor with an instruction rate of 10 MIPS or greater and task switching firmware executed by the microelectronic processor for rapid switching between communication on a peripheral data bus to the peripheral memories and communication on a system data bus having a relatively higher data rate. Also disclosed is a method of data caching on the host system using the peripheral controller.

6 Claims, 3 Drawing Sheets

APPARATUS AND METHOD FOR RAPID SWITCHING BETWEEN CONTROL OF FIRST AND SECOND DMA CIRCUITRY TO EFFECT RAPID SWITCHING BEWEEN DMA COMMUNICATIONS

This application is a continuation of application Ser. No. 07/906,911, filed Jun. 30, 1992, now abandoned.

BACKGROUND OF THE INVENTION

1. Field of the Invention

The invention relates to peripheral controllers and methods for interfacing computers of the minicomputer class to one or more peripheral memories.

2. Description of the Background Art

Peripheral controllers-are provided to interface minicomputer central processing units (CPU's) to various numbers of disk and/or tape memories in an overall computer system. The primary objective of such peripheral controllers is to interface a plurality of peripheral memories to the host computer.

Typical host systems are provided by various well known suppliers of computer equipment including Digital Equipment Corporation. Currently, such systems are provided with a system bus structure. Peripheral memories are serviced through a peripheral I/O bus.

Interfacing peripheral memories to a system bus involves transferring data on the peripheral I/O bus and then transferring the data onto the system bus. The peripheral I/O bus provides a data path which is limited to the speed of the peripheral device. The peripheral memories are serviced in real time by the peripheral controller, and if data is supplied "late", there is a loss of performance or a loss of data. Some system buses have a high data rate, but none can guarantee transfer of time-dependent data. One approach to interfacing the two buses involves the use of static RAM buffer memories or FIFO's (first in, first out RAM memories). Use of FIFO's and data buffers has not removed the problems of system latencies which tend to limit data throughput.

SUMMARY OF THE INVENTION

The invention relates to a peripheral controller for interfacing a plurality of peripheral memories to a host system processor and host system memory through a host system data bus.

The peripheral controller utilizes a dual-ported RAM which stores data that is transferred between the host system memory and the peripheral memories. The dual-ported RAM is interfaced to the system data bus through a first port and is interfaced to the peripheral memories through a second port and a peripheral data bus rated at a lower speed than the system data path. Transfer through both data buses to and from the dual-ported RAM is under DMA control.

The peripheral controller includes a very fast processor interfaced to direct memory access (DMA) circuitry to control data transfers to and from the dual-ported RAM. The peripheral controller processor executes instructions organized for rapid switching between two tasks, including a task for initiating DMA transfer of data through the system data path to the host system memory and a task for initiating DMA transfer of data through the peripheral DMA data path to the peripheral memories. The peripheral controller is operable for rapid switching from one task to another which is essential for fully servicing both DMA paths. Preferably, the peripheral controller processor has a very fast instruction execution rate.

It is one object of the present invention to improve the overall sustainable rate of data transfer between peripheral memories and host systems with the same or disparate data rates and data path widths.

Another object of the invention is to further enhance throughput by providing very large and very flexible data caching using the host system memory.

Another object of the invention is to maximize the throughput between these peripheral memories and host systems regardless of the type of I/O requests being made in the target computing environment (e.g. random vs. sequential, contiguous vs. non-contiguous).

The peripheral controller includes two sets of high level DMA control which provides for two completely separate DMA paths to be active independently and simultaneously. Dual DMA paths and controls allow DMA transfers between the system bus and the peripheral controller dual-ported RAM circular buffer (system DMA) to occur simultaneous to DMA transfers between the peripheral controller dual-ported RAM circular buffer and the peripheral memory (Interface DMA). The dual-ported RAM structure, very fast peripheral controller processor, separate high level control of the two DMA paths, and high level management of the dual-ported RAM circular buffers keeps both paths fully serviced at all times. Prior products utilized a single DMA path which forced all DMA to be subject to limitations of both peripheral speed and host system latencies.

Rapid task switching is assisted by splitting the stack of the peripheral controller processor into two sections, and using one section to serve two tasks for transferring data on the system bus and peripheral bus, respectively. A limited number of data items are saved in the stack for each task, such saved data items including the run state, stack pointer, restart address and user base register address of the task.

In addition, a further aspect of the invention, is that with an external peripheral controller based high speed processor and DMA control of the host system bus, a data cache may be established in the host system memory and data can be transferred to and from the data cache under the control of the peripheral controller, with this control being transparent to the host system processor.

The host based data cache can subsequently be very large and relatively inexpensive. Further, its size can be configured by the user to optimize use in target computing environments.

Various objects and advantages, besides those discussed above, shall be apparent with those familiar with the art from the description of the preferred embodiment of the invention which follows. In the description, reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

DETAILED DESCRIPTION OF THE PREFERRED EMBODIMENT

Figure 1:
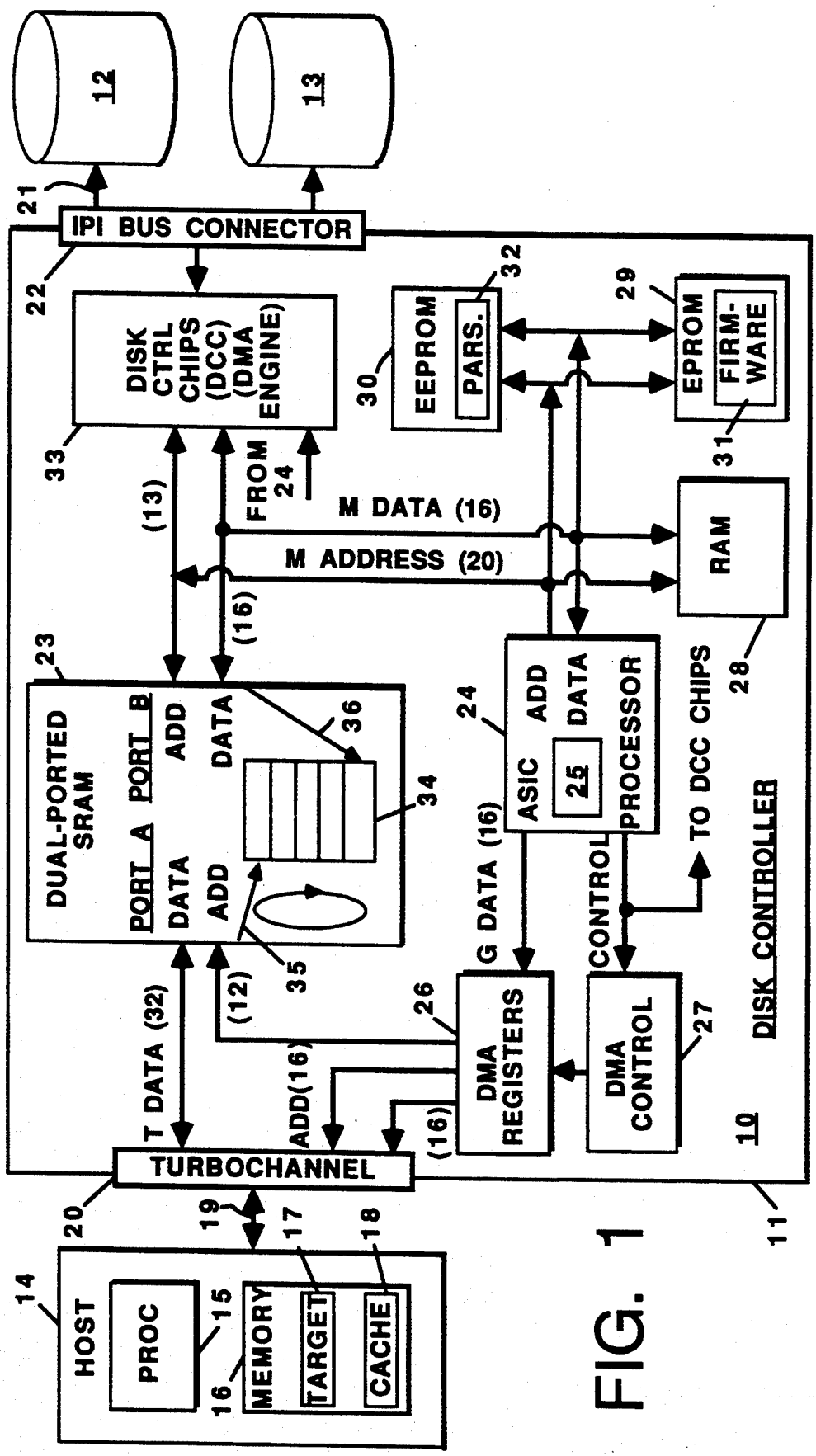
FIG. 1 is a block diagram of a computer system incorporating the peripheral controller of the present invention.

Referring to FIG. 1, the invention is incorporated in a disk controller 10 which may be supported on an individual circuit board 11. The overall function of the disk controller 10 is to interface one or more peripheral disk memories 12 and 13 to a host computer system 14 of the minicomputer class, such as those commercially offered by Digital Equipment Corporation.

The following is a brief description of the host system 14. The host computer 14 has a host system processor 15 and a host system memory 16. The host system memory includes some target locations 17 and locations for an I/O data cache 18 to be explained in more detail below. The host computer system 14 described includes a system bus 19, referred by the trade designation TURBOchannel. The TURBOchannel provides a 32-bit data path and multiplexed address lines. For further specification of the TURBOchannel bus, reference is made to the literature of Digital Equipment Corporation and others which defines the signals in this bus. The host computer system connects to the disk controller 10 through a connector 20 which includes enough lines to accommodate the TURBOchannel bus.

On the other side, the disk controller 10 connects to the disk memories 12, 13 via a daisy chain cabling arrangement which carries signals for an Intelligent Peripheral Interface (IPI) bus 21 which is an industry standard peripheral bus. The disk controller 10 includes a connector 22 for connecting to cables carrying IPI bus signals between the controller 10 and the disk memories 12 and 13.

The disk controller 10 includes a dual-ported static RAM 23 of 16 kilobytes capacity has Port A connected to the TURBOchannel connector 20 through a 32-bit data bus (T DATA). The number of lines in the buses to be discussed are indicated by the "/" symbol and the number in parentheses. Also, it should be understood that various buffers and drivers may be used in the address and data paths indicated, but as these are well understood in the art and form no part of the invention, they have not been illustrated in the drawings.

The disk controller 10 also includes a high speed processor 24, which in this example, is preferably a Model RTX 2001A microelectronic CPU commercially offered by Harris Semiconductor of Melbourne, Fla. This is a reduced instruction set (RISC) machine with a capacity for executing 10 MIPS (million instructions per second). This processor 24 has a certain amount of internal RAM 25, including registers or locations forming what is known as the "stack".

The disk controller processor 24 is connected through its ASIC port and a 16-bit data bus (GDATA) to a group of DMA (direct memory access) registers 26. The DMA registers 26 include two 16-bit registers which store 16 bits of address each, to be transmitted over the TURBOchannel 19, and a memory address register for coupling a 12-bit address to Port A of the dual-ported RAM 23. The disk controller processor 24 is also connected through a control bus (CONTROL) to DMA control circuitry 27 for initiating and controlling a 32-bit DMA data transfer operation between the host memory 16 and Port A of the dual-ported RAM 23 (System DMA).

The disk controller processor 24 has address (ADD) and data (DATA) ports connected to a 20-bit address bus (M ADDRESS) and a 16-bit data bus (M DATA). The disk controller processor 24 is further connected through these buses to a static RAM 28 of 64 kilobytes capacity and 16 bits per addressable location, an EPROM 29 of 64 kilobytes capacity and 16 bits per addressable location, and an EEPROM 30 (electrically erasable PROM) of 8 kilobytes capacity and 8 bits per addressable location. The RAM 28 is used as a scratchpad for storing data and temporary results during operation of the disk controller processor 24, as well as for the storing of certain control tables used in a data caching operation to be discussed below. The EPROM 29 stores a program of firmware operating instructions 31 which are read and executed by the disk controller processor 21. The EEPROM 30 stores system operating parameters 32, which may be altered to effect different modes of operation for the disk controller 10.

The dual-ported RAM 23 has a Port B for address (ADD) and data (DATA) connected through thirteen address lines in the M ADDRESS bus and sixteen data lines in the M DATA bus to a disk memory controller chip and an associate error checking chip represented by block 33 in FIG. 1. The disk memory controller chip 33 has DMA control circuitry within, which is responsive to control signals on the CONTROL bus from the disk controller processor 24 to initiate a DMA data transfer between the dual-ported RAM 23 and the disk memories 12, 13 through the 16-bit data path (Interface DMA).

The dual-ported RAM 23 has an area organized as a circular buffer 34, in which the addressing from the I/O side (disk memory side) accesses a different buffer than the addressing from the host system side. This is represented by the pointers 35, 36 in FIG. 1. Circular buffers are known in the computer arts, as exemplified by Floro et al., U.S. Pat. No. 4,809,217, issued Feb. 28, 1989.

Figure 2:
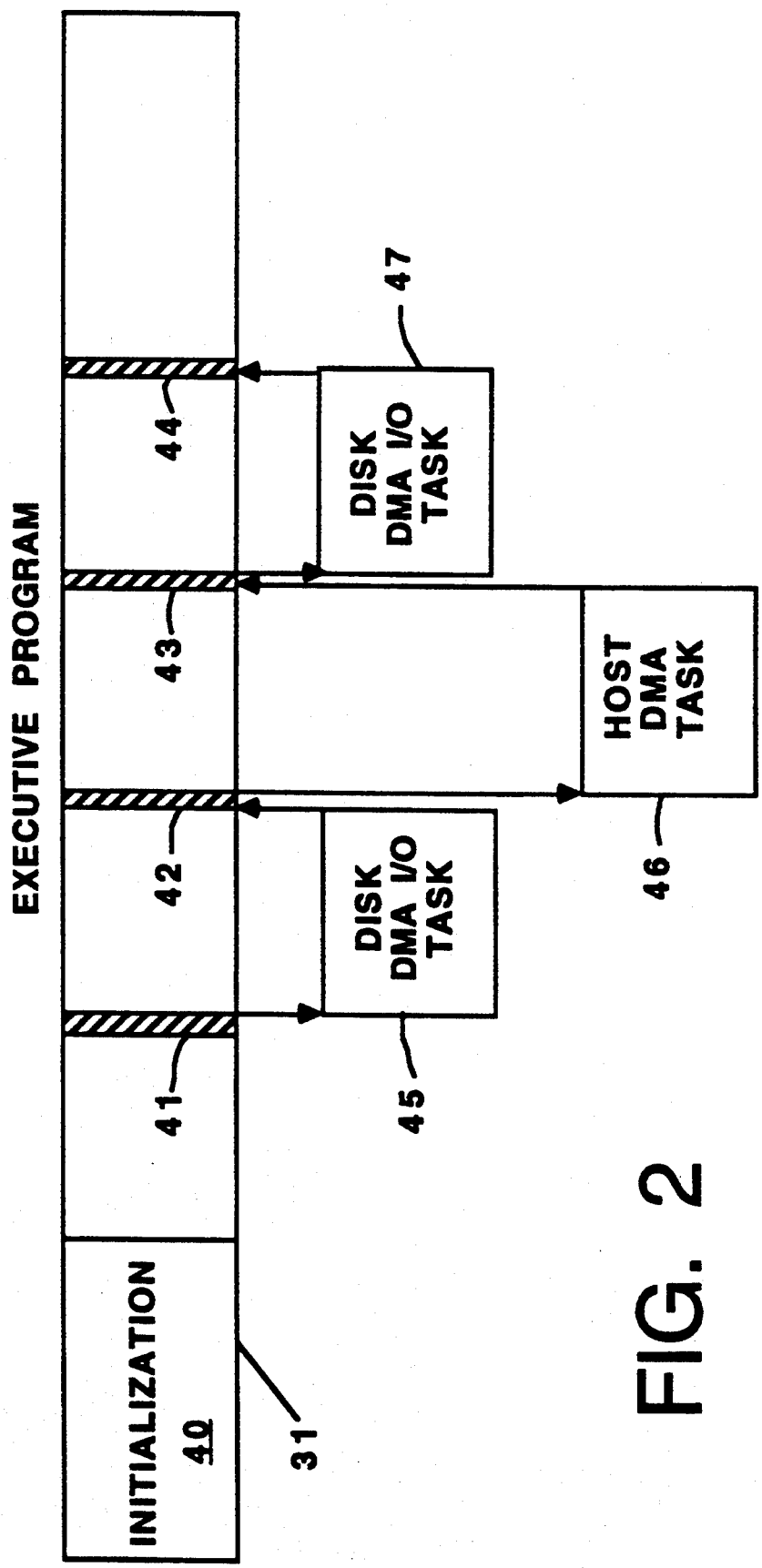
FIG. 2 is a block diagram of the task scheduling firmware used in the peripheral controller of FIG. 1.

Referring to FIG. 2, the control program 31 for the disk controller processor 24 includes an initialization portion 40 that is executed on power up. The processor 24 then enters an executive portion of its control program 31 which includes a task scheduler, which is a high level control task that includes a task switching routine represented by shaded time slices 41, 42, 43, 44 in FIG. 2. The task switching routine, written in FORTH programming language, is listed in Appendix A to this specification. As a result of executing the task switching routine 41, the disk controller processor is switched first to execute a first cycle 45 of a task for DMA transfer of data between one or more of the disk memories and Port B of the dual-ported RAM. This task cannot be interrupted except at certain points (nonpreemptive). When it runs to a certain point and is either completed or interrupted, control returns to the task scheduler, as represented by the arrow. A second cycle of the task switching routine 42 is executed to switch from the task for disk I/O transfer 45 to a task 46 for DMA transfer between Port A of the dual-ported RAM and the host system memory. When it runs to a certain point and is either completed or interrupted, control returns to the task scheduler. In this example, the task switching routine is executed for a third cycle 43 to switch from the task for host DMA transfer 46 to a second cycle 47 of the task for disk DMA I/O transfer. The task switching routine is effective to switch tasks in 4 microseconds or less, which is significant in aiding data throughput through the disk controller 10. This high speed switching is made possible by limiting the number of data items that must be saved on the stack of the disk controller processor 24, in order to maintain context for continuing operations.

Figure 3:
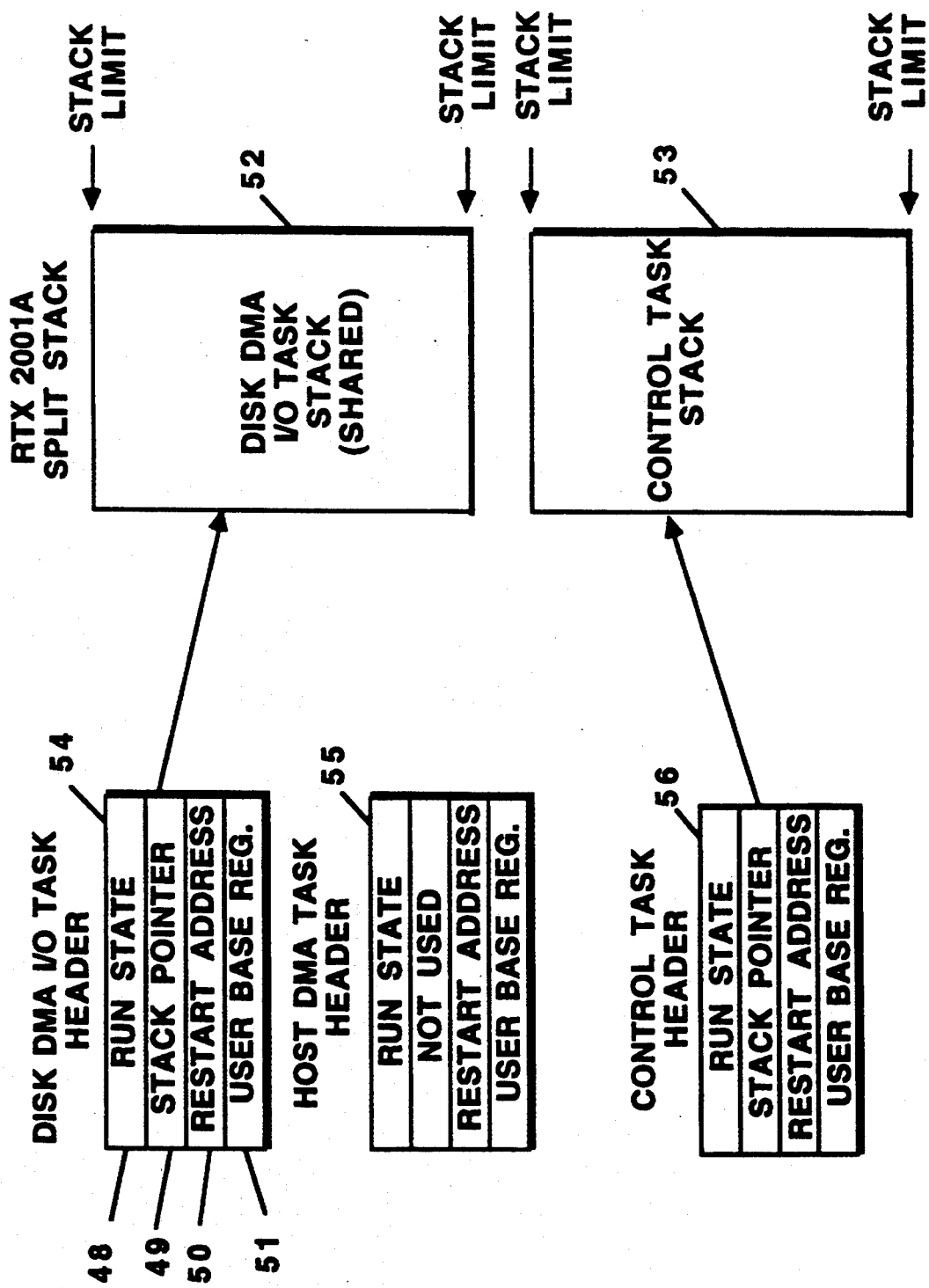
FIG. 3 is a block diagram showing firmware and data elements for fast task switching utilized in the peripheral controller of FIG. 1.

The stack is maintained within the internal RAM 25 of processor 24 for temporary storage of data items and subroutine return addresses during program execution. Referring to FIG. 3, the stack for the disk controller processor 24 is divided into two portions 52, 53. One portion serves as the stack for the high level control task for scheduling and task switching and the other serves the two data transfer tasks, the host DMA transfer task and the disk DMA I/O task. These two portions are provided with stack limits or boundary addresses which are observed by the disk controller in its operations. Each task has a task header block associated with it.

As seen in FIG. 3, the header 54 for the disk DMA I/O task includes data items for the run state 48, a stack pointer 49, a restart address 50, and a user base register address 51. The run state 48 determines whether the task is ready for execution. The stack pointer 49 indicates the next free location on the stack. The restart address 50 is the position in the task program code where execution is to commence when the task is next run. The user base register 51 is used for fast access to a 64 byte block of memory. The task switcher maintains a value for each task, so that cache may access independent memory areas in this manner.

The header 55 for the host DMA task includes all of these except the stack pointer 49. Since this task makes only temporary use of the stack 52, it does not have a separate reserved stack area. Whenever the host DMA task relinquishes control of the stack portion 52, it must leave the stack portion in the same condition as it took control of the stack, so that the stack portion 52 may be utilized by the disk DMA I/O task. Both the host DMA task and disk DMA I/O tasks set up and control DMA which runs simultaneously and independently on the separate DMA paths.

The header 56 for the high level control task operates in the second portion 53 of the stack area of the processor 24 and includes the same header items as described above for disk DMA I/O task.

Host system access to data in the peripheral disk memories is limited by the speed of the attached disk memories, which may be rated in a range from 10 to 25 Mb/second, and is further limited by seek times and rotational delays for accessing data on the disks. Since a cache in host memory can deliver data at much faster rates with no access delays, it is therefore deemed an enhancement to provide an I/O data cache in the host system, so that I/O data is more readily available. The disk controller of the present invention is utilized to provide such a cache.

The disk controller processor 24 initializes tables in the RAM 28 for storing pointers to target locations 12 in regular host system memory and locations in a set-aside data cache 18 area of the host system memory. The host system requests I/O data from the cache 18 via control data transferred to the dual-ported RAM 23, where it is read by the disk controller processor 24. When I/O data is requested by the host system and the disk controller processor 24 determines that such data is already in the cache 18, the required data blocks are copied from the cache buffer 18 in the host memory into the controller and back out through the TURBOchannel to the target memory locations 17. These data transfers are accomplished at rates of up to 100 Mb/sec. The operation of the disk controller processor and its associated DMA control circuitry is transparent to the host system. Using this technique, up to 32 megabytes of system memory can be used for I/O data cache, as compared to prior products providing 1 to 4 megabytes of on-board data cache. A block of 8 kilobytes of data can be moved between the target locations and the data cache in less than 1 millisecond.

With disk memories rated at 9.33 Mb/sec peak rates, disk transfers are accomplished at data rates of 6 Mb/sec between the host system and each disk memory. This is in comparison to competitive rates of 2 Mb/sec using other disk controllers with the same host system and the same disk memory.

The portion of the firmware program which enables the disk controller processor to carry out the data caching operations in the host system is listed in Appendix B to this specification. This portion of the program is written in the FORTH programming language.

This has been a description of a preferred embodiment and methods for carrying out the invention. Those of ordinary skill in the art will recognize that variations may be made in arriving at other detailed embodiments, and these embodiments will come within the scope of the invention. Such variations may include, but are not limited to, a wide range of system buses and a wide range of tape, disk, or system peripheral memories.

Therefore, to apprise the public of the scope of the invention and the embodiments covered by the invention, the following claims are made.

Appendix A

Microcode for Task Scheduling and Switching

NOTICE

This program listing is an unpublished work
in which copyright protection is claimed by
GENROCO, Inc. If publication of this work
should occur, the following notice shall apply:

© 1992 GENROCO, Inc.

```
Jun 26 13:14 1992  pat.ts Page 1

\ tsk_switch - priority based task scheduler
\   Enter with offset of current task header on stack
\   40 (33) cycles to I/O task, +4 (3) cycles for each extra task.
\   Max 37 (30) cycles uninterruptable if entered with ints enabled
\   + 13 if entered uninterruptable.

\ VARIABLE tsk_addr

: tsk_hdr   ( u a -- )                       \ set up initial task header
     DUP UBR! 3 U!                           \ set ubr to this task header block
cond#2000 if\   $103 +                       \ SPR correction factor - RTX-2000
cond#2001A if\  $102 +                       \ SPR correction factor - RTX-2001A
     true 0 U! 1 U!                          \ set initial run-state & spr value
     R@ 2 + 2 U! ;                           \ set initial task restart addr : run_task ( u u -- )                        \ execute task
     CR@ CR!                                 \ enable interrupts
     UBR!                                    \ set task UBR
     R> DROP R!                              \ set task execution address
\    0 AND IPR!                              \ clear index page register & DROP 1 dummy
     DROP $10 IPR!                           \ make sure DPRSEL bit stays set
     DROP ;                                  \ drop 2nd dummy from param stack cond#test #if
     : disp_tksw    ( a -- )
         ." switching to task " .$
         SPR@ .h R@ .h UBR@ .h CR ;
endif   \ cond#test : tsk_suspend ( a -- )                       \ suspend task, then tsk_switch
     false OVER ! [[
: tsk_switch ( a -- )                        \ enter tsk addr
\    tsk.dio OVER = IF ." SPR =" SPR@ .h CR THEN
     UBR@ OVER UBR! 3 DUP_U!                 \ load ubr for this task - leave 2 dummies
     R@ 2 U!                                 \ save restart addr in hdr 2 - leave 1 dummy
cond#2000 if\   [ $102 NEGATE ] LITERAL  \ SPR correction factor - RTX-2000
cond#2001A if\  -1                           \ SPR correction factor - RTX-2001A
     CR@ $10 OR CR!                          \ disable interrupts
     SPR@ + 1 U!                             \ combine SPR@ with + per Harris spec
     % tsk.hdrs UBR!                         \ set UBR to all task headers
     % tsk+dio0 U@  IF
         % tsk+dio1 U@ SPR!                  \ set i/o task stack
         % tsk+dio2 U@ % tsk+dio3 U@  \ load restart addr & UBR value on stack
         run_task THEN                       \ execute task
     % tsk+dma0 U@  IF
         % tsk+dio1 U@ SPR!                  \ set i/o task stack for DMA
         % tsk+dma2 U@ % tsk+dma3 U@  \ load restart addr & UBR value on stack
         run_task THEN                       \ execute task
```

```
% tsk+main0 U@ IF
    % tsk+main1 U@ SPR!         \ set main task stack
    % tsk+main2 U@ % tsk+main3 U@  \ load restart addr & UBR value on stack
    run_task THEN                \ execute task
% tsk+diol U@ SPR!              \ set i/o task stack for idle
% tsk+idle2 U@ % tsk+idle3 U@   \ load restart addr & UBR value on stack
run_task NOP ;                  \ execute task, NOP needed to force sub call
```

Appendix B

Microcode for Caching

NOTICE

This program listing is an unpublished work
in which copyright protection is claimed by
GENROCO, Inc. If publication of this work
should occur, the following notice shall apply:

© 1992 GENROCO, Inc.

```
\ Cache definitions.

VARIABLE    cache.ok
        0   cache.ok !          \ true if caching is on
VARIABLE    cache.clr
        0   cache.clr !         \ true if need to clr cache on this i/o :he_ok ( -- f )
    pt_sw % cache.ok @ AND ;    \ return true if doing cache

?CSP !CSP cond#cache cond#turnk AND #if
    CREATE cache.table          \ dummy cache table
endif  \ cond#cache cond#turnk AND cond#cache cond#turnk 0= AND #if
    CREATE cache.table 2048 8 + ALLOT   \ cache table 2k for down-load
endif  \ cond#cache cond#turnk 0= AND cond#cache #units 9 < AND #if
\ Cache for IPI-2 120T etc. where #units is 8 or lower.

\ Caching table contains 1 entry for each cache group of 8 blks:
\ Associative cache entries stored in pairs
\ Minimum size = 1 Mbyte with 512 byte blks & 8 blks/group
\ Maximum size = 16 Mbytes with 16k table, 512 byte blks, 8 blks/group
\ Max unit size with 512 byte blks = 4 Gbytes \ 16 bits : bits 0-2   unit number
\           bits 3-15  bits 10-22 of LBN for group
\ 16 bits : bits 0-7   bitmap of valid blks in group
\           bit  11    lock bit set during dio ops
\           bit  12    age bit for associative cache
\           bit  14    set if not written to shadow unit
\           bit  15    set if not written to primary unit \ masks for cache table flags etc.
```

```
$0800    CONSTANT    ctf#lock        \ lock bit set during dio ops
$1000    CONSTANT    ctf#age         \ age bit for associative cache
$4000    CONSTANT    ctf#shadow      \ flag to show shadow not written
$8000    CONSTANT    ctf#write       \ flag to show primary not written \ Parameters for cache:

CONSTANT    blks#group       \ blks per group - power of 2 > 2
    CONSTANT    blks#group2      \ power of 2
    :ABLE       group.cnt        \ count of groups in cache
    RIABLE      cache.bc         \ byte count of cache area
2VARIABLE      cache.ba         \ TURBOchannel address of cache area
2VARIABLE      cache.baend      \ TURBOchannel end address of cache area
VARIABLE       cache.start      \ address of cache table start
VARIABLE       cache.end        \ address of cache table end
VARIABLE       group.mask       \ mask for LBN to find group number
\ VARIABLE     cache.hash       \ hashing divisor
VARIABLE       cache.unit       \ current drive unit for cache
VARIABLE       cdma.ptr         \ pointer to cache DMA table

?CSP !CSP

VARIABLE       cache.hit        \ count the cache hits
VARIABLE       cache.miss       \ count the misses
VARIABLE       read.ahead       \ count of sectors to read-ahead
VARIABLE       miss.hit         \ true if hit ratio low CREATE         pra.lbns  32 ALLOT    \ table for next pre-emptive read-ahead : groups_blks ( n -- n )              \ convert groups to blks
    [ blks#group2 2 - ] LITERAL
    OF( 2* 2* ;

: blks_groups ( n -- n )              \ convert blks to groups
    [ blks#group2 2 - ] LITERAL
    OF( U2/ U2/ ;

: 3groups_dblks ( d -- d )            \ double groups to blks
    [ blks#group2 2 - ] LITERAL
    OF( D2* D2* ;

sp_cache ( -- )                     \ display initial cache params
  cache.ok @ IF
      ." Cache buffer @" HEX cache.ba 2@ 9 D.R DECIMAL
      ." size  ="
      group.cnt @ groups_blks blks_dbytes   \ calculate bytes in cache
      19 OF( D2/ DROP                       \ convert to Mb
      6 .R ." Mbytes."
      ." Read ahead =" eep.cahead e@
      5 .R ." kbytes." CR
  THEN ;

: init_cache ( -- )                   \ initialise cache control table
    turn.key @ IF
        1024 names_alloc cdma.ptr !   \ set pointer to cache DMA table
        0 names_alloc                 \ get names area ptr = table end
        16384 names_alloc             \ allocate 16k cache table
    ELSE
        cache.table 7 + $FFF8 AND     \ align to 8 byte boundary
        DUP 1024 + SWAP               \ leave end & start on stack
    THEN
    cache.start ! cache.end !         \ set start/end of cache table
    mreg.cchba L@++ L@++ 4 M+ L@++ L@ \ get cache ba & bcnt
    $7FFF AND                         \ mask out host int flag
    cache.bc 2! 2DUP cache.ba 2!      \ check for ba non-zero
    OR 0<> eep.cache e@ AND           \ and cache enabled
    IF
        1 SR!
        16 0 DO                       \ determine size of cache
            SR@ 2* SR!                \ cache size in groups
            cache.end @ cache.start @ - \ check against max table size
            SR@ 2* 2* U< IF LEAVE THEN  \ exceeded size of table
            cache.bc 2@
```

```
        SR@ blk.size @ groups_blks UM*
        UD< IF LEAVE THEN                       \ exceeded size of cache data
    LOOP
    SR@ 2/ DUP SR! group.cnt !                  \ set group count
    SR@ 4 * cache.end @ SWAP- cache.start !     \ start of cache table
    SR@ 2/ 1 - group.mask !                     \ mask for group in 2 way cache
    cache.start @                               \ address of 1st control entry
    group.cnt @ 1 -
    FOR $FFFF SWAP !++ 0 SWAP !++ NEXT          \ initialise each 32 bit entry
    DROP
    group.cnt @ blk.size @ UM*                  \ get size of cache data in use
    cache.ba 2@ D+ cache.baend 2!               \ set TURBO addr of cache end
    true cache.ok !                             \ set cache OK
    eep.cahead e@ 1024 blk.size @ / *
    eep.cahead e@ 1024 M* dbytes_blks
    $FFF8 AND read.ahead ! false miss.hit !     \ read ahead sector count
ELSE
    group.cnt 0!
    false cache.ok !                            \ no cache
THEN
turn.key @ IF
    cache.end @ group.cnt @ 4 * - names.ptr !   \ correct the space allocation
THEN
pra.lbns 16 WERASE ;                            \ clr pre-emptive r/a flags .t_miss ( -- )                                  \ evaluate hit/miss ratio
cache.hit @ cache.miss @ 2/ U<                  \ set miss.hit true or false
aswf#out OVER
IF clr_asicwf ELSE set_asicwf THEN              \ set UART board LED
miss.hit ! cache.hit 0! cache.miss 0! ;

: calc_entry ( dw -- a )                        \ ^get entry address for lbn
    DROP
    [[

: calc_ent1 ( n -- a )                          \ enter with lo 16 bits LBN
    blks_groups group.mask @ AND
    2* 2* 2* % cache.start @ + ;                \ return addr of entry : calc_clbn ( dw -- u )                         \ ^calc lbn entry in cache
    6 OF( D2/ DROP                              \ get LBN 10-22 into 3-15
    $FFF8 AND % cache.unit @ OR ;               \ put unit number in lo 3 bits : find_entry ( dw -- a f )                      \ returns match or oldest
    dio_switch                                  \ allow DIO task to run
    OVER SWAP calc_clbn SWAP                    \ get cache entry value
    calc_ent1 DUP >R                            \ get base addr of group
    @ OVER = IF                                 \ check 1st entry
        DROP R> true EXIT                       \ return true with address
    ELSE
        R@ 4 + @ = IF
            R> 4 + true EXIT                    \ return true with address
        ELSE
            R@ 2 + @ % ct#age AND IF
                R> 4 +                          \ 2nd entry is oldest
            ELSE
                R>
            THEN
            false EXIT                          \ exit false
        THEN
    THEN ;

: lock_entry ( dw -- a )                        \ locks entry, match or oldest
    find_entry DROP                             \ get match or oldest
    $FFFF OVER !++                              \ set invalid unit/LBN
    DUP @ % ct#lock OR SWAP ! ;                 \ set lock bit : set_age ( a -- )                              \ set entry youngest
    2 + DUP @ % ct#age OR OVER !                \ set this entry to 1
    DUP 4 AND IF 4 - ELSE 4 + THEN              \ set address to alternate
    DUP @ [ ct#age NOT ] LITERAL AND SWAP ! ;   \ set alternate entry to 0

: cache_addr ( a -- da )                        \ ^get TURBO addr frm entry addr
    % cache.start @ - U2/ U2/                   \ group offset from cache start
    blks_dbytes dgroups_dblks                   \ get TURBO offset by shifting
    % cache.ba 2@ D+ ;                          \ add cache base address
```

```
    _grps ( n dw -- dw n )                      \ convert to whole groups
        >R                                      \ blk count
        R [ blks#group 1 - ] LITERAL AND        \ get blk offset from group strt
        + 1 - blks_groups ;                     \ return whole groups - 1 check_lbns ( n dw -- f )                    \ ^ret true if all LBN's valid
        lbns_grps FOR                           \ get lbn grps-1 count
            2DUP find_entry                     \ try to find entry
            NIP DUP SR!                         \ set true/false
            NOT IF
                0 R!                            \ leave loop with flag 0
            THEN
            % blks#group 0 D+                   \ increment LBN
        NEXT
        2DROP SR@ ;

: clr_lbns ( n dw -- )                          \ ^ret true if all LBN's valid
    lbns_grps FOR                               \ get lbn grps-1 count
        2DUP find_entry                         \ try to find entry
        IF
            $FFFF SWAP !++ 0 SWAP !             \ set invalid entry
        ELSE
            DROP
        THEN
        % blks#group 0 D+                       \ increment LBN
    NEXT
    2DROP ;

: cache_clru ( U -- )                           \ ^clear unit entries in cache
    SR! cache.start @                           \ put unit in SR
    group.cnt @ 1 - FOR
        @++ SWAP 7 AND SR@ = IF                 \ check for specified unit
            2 - $FFFF SWAP !++                  \ write invalid entry
            0 SWAP !++
        ELSE
        THEN
    NEXT DROP ;

: set_lbns ( n dw -- )                          \ ^set LBN's valid in cache
    lbns_grps FOR                               \ get lbn grps-1 count
        2DUP find_entry                         \ try to find entry
        NOT IF
            SR! 2DUP calc_clbn SR@ ! SR@        \ set valid
        THEN
        set_age                                 \ set youngest entry
        % blks#group 0 D+                       \ increment LBN
    NEXT
    2DROP ;

: unlock_group ( dw -- dw+ )                    \ unlock a single cache group
    2DUP calc_clbn                              \ get LBN entry value
    2_PICK calc_ent1                            \ get address of table entry
    DUP 2 + @ % ctf#lock AND IF                 \ check lock bit
        DUP 6 +                                 \ set address for alt half flags
    ELSE
        4 + DUP 2 -                             \ set addr for alt half flags
    THEN
    DUP @                                       \ read flags for alt half
    [ ctf#age NOT ] LITERAL AND SWAP !          \ write alt half flags - age
    !++ % ctf#age SWAP !                        \ write entry without lock
    % blks#group 0 D+ ;                         \ increment LBN : unlock_lbns ( n dw -- )                       \ unlock locked groups
    lbns_grps FOR                               \ get lbn grps-1 count
        unlock_group                            \ unlock a cache group
    NEXT
    2DROP ;

: cache_cponl ( -- )                            \ ^unit on-line cache processing
    cache_ok IF
\       [ p+unsz 1 + ] LITERAL U@               \ get hi word of unit size
\       group.cnt @ U2/ U2/ U2/                 \ check against group count/4
\       U< IF
\           % p+unit U@ cache_clru              \ clr out cache entries for unit
```

```
\       ELSE
\           false cache.ok !                           \ switch off cache
\       THEN
        % p+unit U@ cache_clru                         \ clr out cache entries for unit
    THEN ;

: cache_dioclr ( -- )                                  \ clr table entries for this pkt
    % p+unit U@ cache.unit !                           \ set cache unit number
    blks_lbn clr_lbns                                  \ clr LBN's in cache table
    false cache.clr ! ;

\ Cache operations cond#turnk 0= cond#cache AND #if

CREATE  cdma.table  1024 ALLOT      \ scatter/gather table for load_cache DMA
        cdma.table  cdma.ptr !

endif   \ cond#turnk 0= cond#cache AND cond#cache #if
\ ==

: get_cdata ( lbn -- lbn bc )                          \ get cache data into buffer
    OVER DUP >R OVER find_entry                        \ save lo LBN on ret stack
    NOT IF CR ." find_entry in read_cache failed." .h key_wait THEN
    cache_addr                                         \ get address of group
    R> [ blks#group 1 - ] LITERAL AND                  \ offset in group
    DUP >R blks_bytes 0 D+                             \ TURBO addr for LBN in group
    % blks#group R> - blks_bytes                       \ bytes remaining in cache group
    % rdwrt.diomsg @ IF                                \ check if data.buff available
        % data.buff                                    \ must stop at data.buff
    ELSE
        % data.end @                                   \ byte count for whole buffer
    THEN
    % data#gap -                                       \ allow for 4 byte buffer zone
    % cache.buff - UMIN
\   1024 UMIN                                \ == set cache.buff min
    % dma+sync U@ blks_bytes                           \ get lo order remaining bytes
    ?DUP IF UMIN THEN                                  \ no more than remaining blks
    >R                                                 \ save BC on return stack
    % cache.buff % dma+cba DUP_U! R@
    % fn#dmin mscp_dma                                 \ DMA in from cache
    R@ bytes_blks                                      \ get blks of cache data read
    % dma+sync U@ OVER - % dma+sync U!                 \ update blk counter
    0 D+ R> NOP ;                                      \ update LBN & return bc : read_cache ( a -- )                                  \ ^copy cache data to user buff
\ t\    t1
\   % p+blks U@ 8 = IF DROP EXIT THEN    \ == fake any 4k transfers
    >R                                                 \ save addr for scat/gath table
    blks_lbn ROT
    DUP mon.blks +!                                    \ update monitor counters
    dio_switch                                         \ allow DIO task to run
    R> rdwrt_getdma                                    \ get DMA params - arg = addr
    get_freeb UBR!                                     \ get msg area for variables
    % dma+scat U! % dma+hiba U! % dma+loba U!          \ save initial DMA params
    % dma+hidwc U! % dma+lodwc U!                      \ * * actually bytes here
\ t\    1 mon.xx +! % dma+scat U@ IF 1 mon.yy +! THEN
    % dma+sync U!                                      \ blk count for transfer
    -1 FOR                                             \ loop till bc is 0
        dio_switch                                     \ allow DIO task to run
        get_cdata                                      \ get cache data
        BEGIN                                          \ * * 1 on stack = byte count
            dio_switch                                 \ allow DIO task to run
            DUP
            % dma+hidwc U@ IF ELSE
                % dma+lodwc U@ UMIN                    \ get min of burst & lo dwc
            THEN                                       \ * * 2 on stack
            DUP SR! - SR@                              \ burst in SR, & update bc
            % dma+loba U@ % dma+hiba U@                \ TURBO addr
            2DUP SR@ 0 D+                              \ move on for next chunk
            % dma+hiba U! % dma+loba U!                \ rewrite
```

```
        % dma+cba U@ DUP SR@ + % dma+cba U!    \ get & update cba
    wait_dmadone                                \ wait for last DMA to complete
    SR@ % fn#dmout mscp_dma                     \ DMA out to user area
    % dma+lodwc U@ % dma+hidwc U@               \ get overall byte count
    ROT NEGATE -1 D+                            \ update byte count
    OVER % dma+lodwc U! % dma+hidwc DUP_U!
    OR-IF                                       \ check for zero BC
    ELSE                                        \ zero BC
        % dma+scat U@ DUP SR!                   \ read pointer to SG table
        IF
            SR@ @++ @++ @++ @++                 \ read the 4 word entry
            % dma+scat U!                       \ rewrite the pointer
            % dma+hiba U! % dma+loba U!         \ write params in reverse order
            OVER % dma+lodwc U!                 \ set wc & leave on stack
            % dma+hidwc DUP_U!
            OR IF ELSE 0 AND DUP R! THEN        \ finish on 0 bc
        ELSE
            0 AND DUP R!                        \ finish on 0 bc
        THEN
    THEN
    DUP                                         \ check for 0 bc
    WHILE REPEAT
    DROP
    wait_dmadone                                \ just in case it was held up
    NEXT
    2DROP
    dio_switch                                  \ allow DIO task to run
    put_freebu set_mscpubr                      \ discard message block
    % p+sts U@ IF
        cond#cache if\ cache_dioclr             \ clear out cache if I/O error
    THEN ;

: cache_rdpkt ( -- f )                          \ process cache read pkt
\ t\    rdwrt.diomsg @ IF false EXIT THEN       \ == avoid interleaved pkts
    % p+unit U@ cache.unit !                    \ set cache unit
    blks_lbn check_lbns DUP IF                  \ check for cached data
        dio_switch                              \ allow DIO task to run
        S" cache_rdpkt" trace_mscpop
        force_wrt? IF
            force_rd                            \ do read of forced wrt error
        ELSE
\ t\        rdwrt.diomsg @ IF 0 AND EXIT THEN   \ == avoid interleaved pkts
            1 cache.hit +!                      \ cache hit
            expr.ptr @ read_cache               \ do a read from cache
            0 % p+sts U!                        \ successful status return
\ t\            rdwrt.diomsg @ IF 0 AND EXIT THEN  \ == avoid interleaved pkts
            32 cmd_done                         \ do response completion
        THEN
        do_rsp                                  \ return response pkt
    THEN ;                                      \ return true if done from cache : set_cachedma ( n dw -- )                      \ ^set up DMA message
    get_freebz                                  \ msg for DMA
    UBR@ rdwrt.dmamsg ! dma.sync 0!             \ save msg addr & clr sync
    fn#dmout % dma+cmd U!
    4data.buff % dma+cba U!
    cdma.ptr @ SR!                              \ pointer to scat/gather table
    ROT blks_groups 1 -
    FOR                                         \ loop for each group
        SR@ >R 2DUP lock_entry R> SR!
        cache_addr SWAP                         \ get TURBO address of group
        % blks@group blks_dbytes SWAP
        SR@ !++ !++ !++ !++ SR!                 \ write entry to table
        % blks@group 0 D+                       \ update LBN
    NEXT
    2DROP
    0 0 SR@ !++ !                               \ zero byte count to terminate
    cdma.ptr @ @++ @++ @++ @                    \ get 1st scat/gath entry
    D2/ D2/ % dma+hiba U! % dma+loba U!         \ initial TURBO addr
    D2/ D2/ % dma+hidwc U! % dma+lodwc U!       \ initial double word count
    cdma.ptr @ 8 + % dma+scat U!                \ set scatter table pointer
    dma.queue UBR@ que_blk true tsk.dma ! ;     \ queue msg for DMA
```

```
2VARIABLE   crw.lbn                              \ LBN for load_cache
VARIABLE    crw.blks                             \ blk count for load cache
VARIABLE    crw.scat                             \ hold scat/gath ptr
VARIABLE    crw.ok                               \ flag true if DIO is good : next_group ( -- )                              \ check if cache group completed
    BEGIN
        dio_switch                               \ allow DIO task to run
        rdwrt.dmamsg @ UBR!                      \ set DMA msg UBR
        crw.blks @                               \ check for more groups to do
        crw.scat @ % dma+scat U@ <>              \ see if cache group done
        AND IF
            dio_switch                           \ allow DIO task to run
            crw.lbn 2@ unlock_group crw.lbn 2!   \ unlock the next group
            dio_switch                           \ allow DIO task to run
            @ crw.scat +!                        \ update scat/gath table ptr
            % blks@group NEGATE crw.blks +!      \ update blk count
            mscp.ubr @ DUP UBR!                  \ save old MSCP UBR
            % p+unit U@ 2* % link.pkt +          \ get link head for unit
            cache.unit @ 2* link.pkt +           \ get link head for unit
            @ DUP UBR! crw.ok @ AND              \ set 1st pkt UBR & check crw.ok
            IF
                BEGIN
                    dio_switch                   \ allow DIO task to run
                    UBR@ mscp.ubr !              \ set mscp UBR
                    % p+flink U@                 \ put fwd link on stack
                    % p+opcd U@ $21 = IF         \ see if it's a read
                        cache_rdpkt              \ try to do from cache
                        IF                       \ check completed OK
                            oprd.ubr @ UBR@ =    \ see if it was from op_rd
                            IF oprd.ubr 0! THEN  \ indicate completion
                        THEN
                    THEN
                    DUP UBR!                     \ get next in list, if any
                    WHILE REPEAT
                THEN
                mscp.ubr !                       \ restore MSCP UBR
                false                            \ continue loop
            ELSE
                true
            THEN
    UNTIL ;

: cache_rwdone ( n dw -- f )                     \ wait for rd/wrt ops completed
    crw.lbn 2! crw.blks ! true crw.ok !          \ save lbn & blk count
    cdma.ptr @ 8 + crw.scat !                    \ save initial scat/gath ptr
    tsk.main tsk_switch                          \ allow dio/dma to run
    rdwrt.diomsg @ UBR!
    mscp_disp? IF
        % dio+cyl U@ % dio+unit U@ disp_head     \ show head position
        mon_mscp                                 \ do timed monitoring
    THEN
    BEGIN
        tsk.main tsk_switch                      \ allow dio/dma to run
        ip.read @ IF
            cache.unit @ ( mscp.ubr @ )          \ save MSCP UBR value
            wrw.save !                           \ reduce param stack usage
            try_cmd.addr @EXECUTE                \ try for another cmd
            wrw.save @                           \ restore stack
            ( mscp.ubr ! ) cache.unit !          \ restore MSCP UBR
        THEN
        rdwrt.diomsg @ UBR!                      \ set dio message UBR
        % dio+stat U@ 0<> IF
            % dio+stat U@ stat$suc = crw.ok !    \ update DIO OK flag
            rdwrt.dmamsg @ UBR! % dma+stat U@    \ get DMA message status
        ELSE
            false                                \ dio not done yet
        THEN
        rdwrt.diomsg @ UBR!                      \ set to DIO msg
        % dio+errcnt U@ 0= IF next_group THEN    \ check for cache group done
    UNTIL
\   set_mscpubr                                  \ reset MSCP UBR
    crw.ok @ ;                                   \ return flag for DIO ok
```

```
CREATE  save.load   6 ALLOT          \ save area for params to reduce stack

: load_cache ( n dw -- f )           \ ^load n blks from LBN dw
    % p+unit U@
    get_freebz                       \ get message blk for DIO
    % dio+unit DUP_U! cache.unit !   \ set unit
    2DUP lbn_log                     \ map to cyl/hd/sec
    % dio+sect U! % dio+head U! % dio+cyl U!  \ write out sect,head,cyl
    2DUP % dio+hilbn U! % dio+lolbn U!        \ write out 32 bit lbn
    data.buff % dio+cba U!           \ write SRAM buffer address
    fn#read % dio+cmd U! UBR@ rdwrt.diomsg !  \ write cmd code, & save UBR
    dio.sync 0!                      \ initialise dio sync
    2_PICK % dio+blks U!             \ set blks with read-ahead
    dio.queue UBR@ que_blk true tsk.dio !  \ queue msg for DIO
    3DUP ROT 0 D+                    \ get LBN after this read-ahead
    % dio+unit U@ 2* 2* pra.lbns + 2! \ save LBN for next read-ahead
    3DUP set_cachedma                \ set up DMA into cache
    3DUP save.load !++ !++ !         \ save params to reduce stack
    cache_rwdone                     \ wait for dio complete
    IF
\ t\    CR ." load_cache good " CR
        ( DROP 2DROP ) true          \ DIO was good so return true
    ELSE
\ t\    CR ." load_cache bad " CR
        save.load 4 + @-- @-- @      \ restore params
        3DUP unlock_lbns             \ need to unlock 1st
        clr_lbns false               \ bad DIO, so clr LBN's
    THEN
\   set_mscpubr                      \ put back MSCP pkt UBR
\   crw.blks @ IF ." crw.blks 0<>" key_wait THEN \ ==
    1 mon.dio +!                     \ increment monitor counter
    rdwrt.diomsg DUP @ put_freeb 0!  \ discard DIO msg & clr flag
    rdwrt.dmamsg @ put_freeb ;       \ discard DMA msg : read_ahead ( -- )                  \ pre-emptive read-ahead
\   EXIT                             \ == no pre-emptive read ahead
    rdwrt.diomsg @ 0= miss.hit @ NOT AND IF  \ only pre-empt with hi hits
        set_mscpubr                  \ set to pkt just processed
        % p+unit U@ 2* 2* pra.lbns + 2@ 2DUP  \ get LBN for next read-ahead
        % p+lbn U@ % p+lbn+2 U@ D-
        read.ahead @ 0               \ get LBN + read-ahead
        UD< IF
            % p+unit U@ DUP unit_sel
            unit_busy NOT IF
                % p+unit U@ cache.unit !  \ set cache processing unit
                UBR@ con.pkt @ DUP UBR!
                DUP mscp.ubr ! 32 WMOVE   \ set UBR & params for WMOVE
                read.ahead @ -ROT         \ set load_cache params
                load_cache DROP           \ load cache with read ahead
            ELSE
                DROP DROP EXIT            \ no pre-emptive read-ahead yet
            THEN
        ELSE
            DROP DROP EXIT                \ no pre-emptive read-ahead yet
        THEN
    THEN ;

: cache_oprd ( -- )                  \ ^cacheing function for op_rd
    % p+blks U@ 65 U< IF             \ check transfer size <= 64 blks
\   % p+blks U@ 33 U< IF    \ ==     \ check transfer size <= 64 blks
        cache_rdpkt                  \ try to do pkt from cache
        IF
            oprd.ubr 0!              \ to indicate completion
        ELSE
            1 cache.miss +!          \ cache miss
            read.ahead @ ?DUP IF     \ check for read-ahead on
                miss.hit @ IF
                    DROP % p+blks U@ \ set read-ahead to blks
                THEN
                % p+blks U@ +        \ + blks for transfer
                [ blks#group 1 - ] LITERAL
                DUP SR! % p+lbn U@ AND +
                SR@ + SR@ NOT AND    \ make count = integral groups
                % p+lbn U@ SR@ NOT AND  \ take LBN back to group
```

```
    % p+lbn+2 U#
    -1 cache.hit +!        \ allow for false hit
    load_cache DROP        \ read data into cache set_mscpubr         \ put back MSCP pkt UBR
            THEN
        THEN
    THEN ;

endif   \ cond#cache
```

We claim:

1. A peripheral controller for interfacing one or more peripheral memories through a peripheral data path to a host system processor and a host system memory operable on a system data path, the peripheral controller comprising:
- a RAM memory with first and second ports for storing data which is transferred between the host system memory and the peripheral memories, the RAM memory being operably connected to the host system memory through the first port and the system data path, which has a higher data transfer rate than the peripheral data path, the RAM memory being operably connected to the peripheral memories through the second port and through the peripheral data path;
- means for storing instructions for execution by a peripheral controller processor, said instructions including instructions organized for rapid switching of the peripheral controller processor between a task for controlling first DMA circuitry for initiating DMA transfer of data through the system data path to the host system memory and a task for controlling second DMA circuitry for initiating DMA transfer of data through the peripheral data path to the peripheral memories; and
- a peripheral controller processor operably connected to first DMA circuitry controlling data transfer through the peripheral data path and operably connected to second DMA circuitry controlling data transfer through the system data path, the peripheral controller processor executing the instructions for rapid switching between control of the first DMA circuitry and control of the second DMA circuitry to effect rapid switching between DMA communication on the system data path and DMA communication on the peripheral data path.

2. A peripheral controller for interfacing one or more peripheral memories through a peripheral data path to a host system processor and a host system memory operable on a system data path, the peripheral controller comprising:
- a RAM memory with first and second ports for storing data which is transferred between the host system memory and the peripheral memories the RAM memory being operably connected to the host system memory through the first port and the system data path, which has a higher data transfer rate than the peripheral data path, the RAM memory being operably connected to the peripheral memories through the second port and through the peripheral data path;
- means for storing instructions for execution by a peripheral controller processor, said instructions including instructions organized for rapid switching of the peripheral controller processor between a task for initiating DMA transfer of data through the system data path to the system memory and a task for initiating DMA transfer of data through the peripheral data path to the peripheral memories; and
- a peripheral controller processor operably connected to first DMA circuitry controlling data transfer through the peripheral data path and operably connected to second DMA circuitry controlling data transfer through the system data path, the peripheral controller processor executing the instruction for rapid switching between DMA communication on the system data path and DMA communication on the peripheral data path: and
- wherein the instructions are executed to save a limited number of data items when executing rapid task switching, such data items consisting of a run state, a stack pointer, a restart address, and a user base register address of a current task, and wherein the instructions are executed to restore the restart address, stack pointer and user base register address for a next task to be executed.

3. The peripheral controller of claim 2, wherein the peripheral controller processor has a nominal execution rate of at least 10 MIPS.

4. A peripheral controller for interfacing one or more peripheral memories through a peripheral data path to a host system processor and a host system memory operable on a system data path, the peripheral controller comprising:
- a RAM memory with first and second ports for storing data which is transferred between the host system memory and the peripheral memories, the RAM memory being operably connected to the host system memory through the first port and the system data path, which has a higher data transfer rate than the peripheral data path, the RAM memory being operably connected to the peripheral memories through the second port and through the peripheral data path;
- means for storing instructions for execution by a peripheral controller processor, said instructions including instructions organized for rapid switching of the peripheral controller processor between a task for initiating DMA transfer of data through the system data path to the host system memory and a task for initiating DMA transfer of data through the peripheral data path to the peripheral memories; and a peripheral controller process or operably connected to first DMA circuitry controlling data transfer through the peripheral data path and operably connected to second DMA circuitry controlling data transfer through the system data path, the peripheral controller processor executing the instructions for rapid switching between DMA communication on the system data path and DMA communication on the peripheral data path; and wherein the peripheral controller processor executes the instructions to achieve high speed switching by executing instructions utilizing a stack register area of the peripheral controller processor that is split into two portions, one portion being used for saving data items for a first and second tasks and another portion being used for saving data items for a control task that controls installation of the first and second tasks for execution.

5. The peripheral controller of claim 4, wherein the peripheral controller processor has a nominal execution rate of at least 10 MIPS.

6. A method of interfacing a plurality of peripheral memories to a host system processor and a host system memory by interfacing a system data path and a peripheral data path, utilizing a dual-ported RAM memory which is interfaced to the host system memory through a first port and the system data path, the dual-ported RAM memory also being interfaced to the peripheral memories through a second port and through a peripheral data path, the method comprising:

transferring blocks of data under DMA control through the system data path from the host system memory to the dual-ported RAM memory;

transferring blocks of data under DMA control through the peripheral data path from the peripheral memories to the dual-ported RAM memory; and a peripheral controller processor executing high speed switching between a first task for executing DMA transfers to the host memory and a second task for executing DMA transfers for the peripheral memories, wherein such high speed switching is accomplished by the peripheral controller processor executing instructions utilizing a stack register area of the peripheral controller processor that is split into two portions, one portion being used for saving data items for a first and second tasks and another portion being used for saving data items for a control task that controls installation of the first and second tasks for execution.

* * * * *

UNITED STATES PATENT AND TRADEMARK OFFICE
CERTIFICATE OF CORRECTION

PATENT NO. : 5,420,984

DATED : May 30, 1995

INVENTOR(S) : Good, et al.

It is certified that error appears in the above-identified patent and that said Letters Patent is hereby corrected as shown below:

| | |
|---|---|
| Col. 1, line 16 | Delete "-" after controllers. |
| Col. 25, line 64 | Add "," after peripheral memories. |
| Col. 26, line 28 | "system memory" should be --host system memory--. |
| Col. 26, line 38 | "instruction" should be --instructions--. |
| Col. 26, line 40 | "data path:" should be --data path;--. |

Signed and Sealed this

Twenty-ninth Day of August, 1995

Attest:

BRUCE LEHMAN

Attesting Officer

Commissioner of Patents and Trademarks